United States Patent [19]

Rom

[11] Patent Number: 5,513,933
[45] Date of Patent: May 7, 1996

[54] STAKED FASTENER WITH UNDERCUT

[75] Inventor: Ronald R. Rom, Rochester, Ind.

[73] Assignee: Textron Inc., Providence, R.I.

[21] Appl. No.: 222,457

[22] Filed: Apr. 4, 1994

[51] Int. Cl.⁶ .............................. F16B 37/04; B21H 3/02; B23P 11/00
[52] U.S. Cl. ............................. 411/180; 411/107; 470/12; 29/432.2
[58] Field of Search .................................... 411/179, 180, 411/181, 107; 470/11, 12; 29/432.2, 525.2

[56] References Cited

U.S. PATENT DOCUMENTS

| | | | |
|---|---|---|---|
| 3,133,579 | 5/1964 | Grimm et al. | 411/180 |
| 3,253,631 | 5/1966 | Reusser | 411/179 |
| 3,399,705 | 9/1968 | Breed et al. | 411/180 |
| 3,584,667 | 6/1971 | Reiland | 145/50 |
| 3,736,969 | 6/1973 | Warn et al. | 411/179 |
| 3,967,669 | 7/1976 | Egner . | |
| 4,543,023 | 9/1985 | Capuano | 411/180 |
| 4,637,766 | 1/1987 | Milliser | 411/180 |

FOREIGN PATENT DOCUMENTS

WO94/01688  1/1994  WIPO .

OTHER PUBLICATIONS

RIMS, D–91126 Schwabach, Bahnhofstrasse S–16, RIMS®, Automatisierte Verbindungstechnik in Blechen, covers and pp. 1–9, drawings nos. 7191w, SK1668, and translation of pp. 1–9, Richard Bergner GmbH & Co., 1994.

*Primary Examiner*—Neill R. Wilson
*Attorney, Agent, or Firm*—Trexler, Busnell, Giangiorgi & Blackstone, Ltd.

[57] ABSTRACT

A self-clinching fastener is provided, of the type for connection to a section of sheet material having an aperture formed therein for receiving the fastener. The self-clinching fastener comprises a head portion and a shank portion having a smaller outer diameter than the head portion and extending axially from one side of the head portion. A displacement portion extends axially from the one side of the head portion extending radially outwardly of the shank portion. An undercut annular groove is formed inwardly of the displacement portion, extending axially in the direction of the head portion and radially surrounding the shank portion. A generally annular sizing ring is formed about the shank portion axially spaced from the one side of the head portion by an amount somewhat greater than the axial extent of the displacement portion. The outer diameter of the sizing ring is greater than the outer diameter of the shank portion and also greater than the inner diameter of the undercut annular groove.

29 Claims, 3 Drawing Sheets

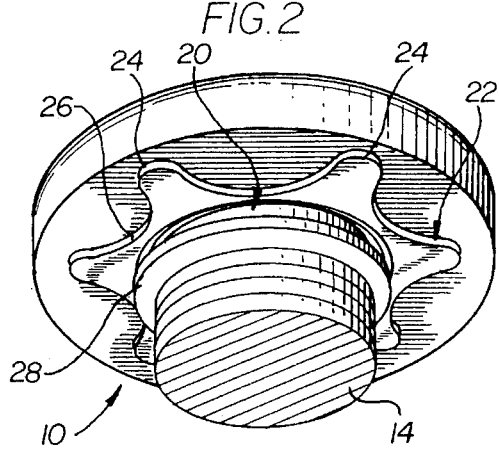
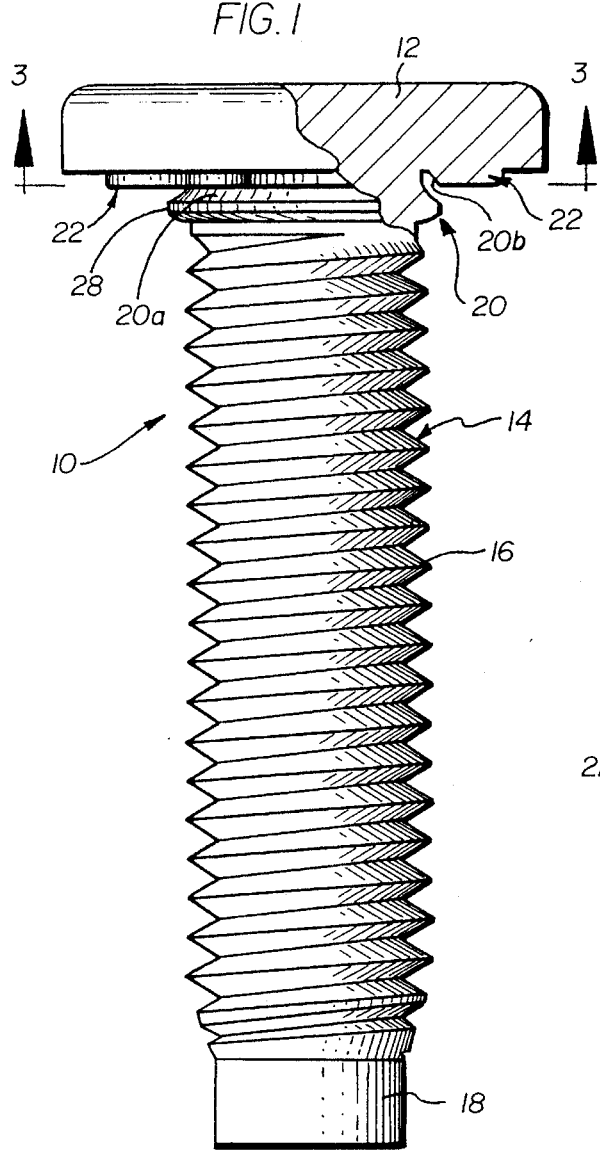
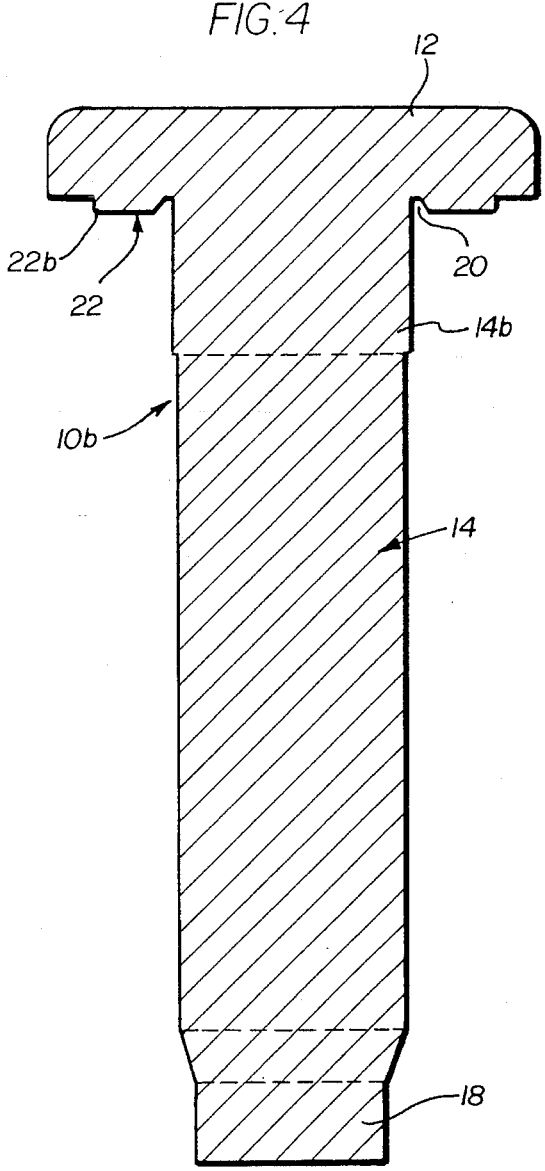
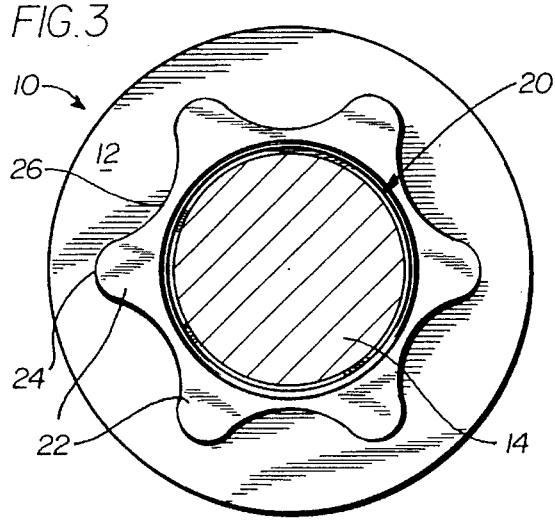

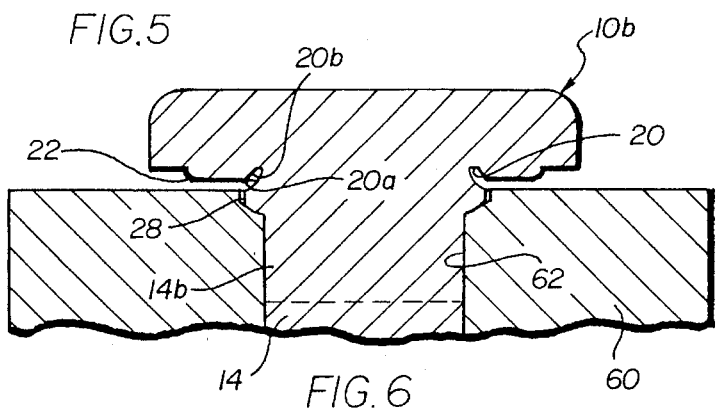
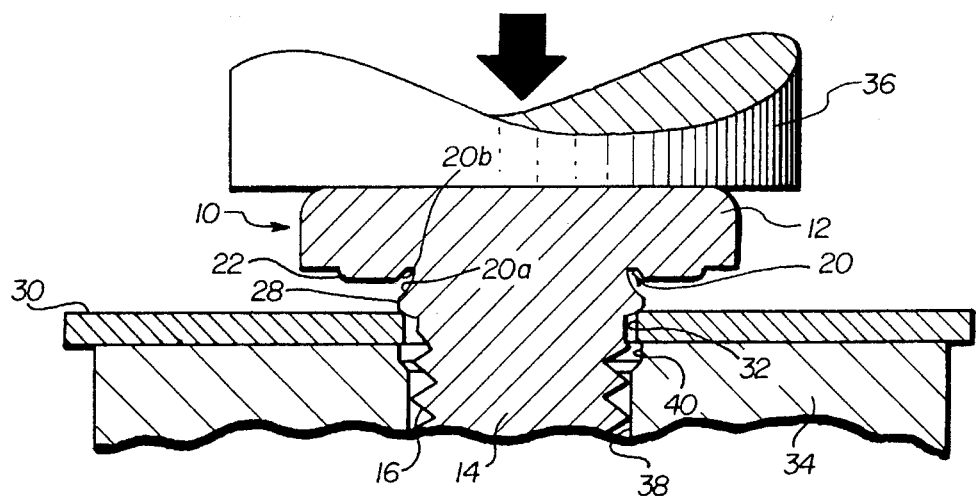
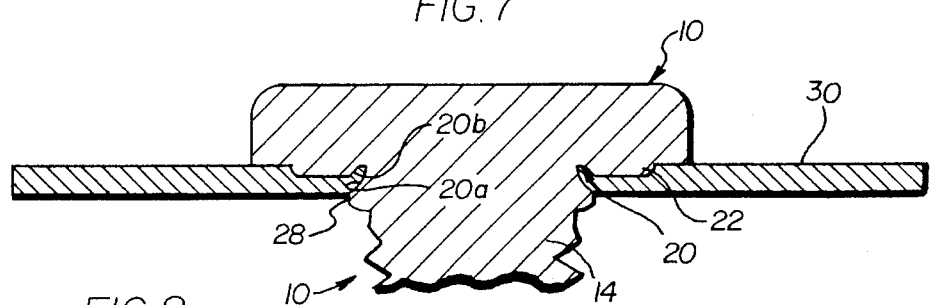
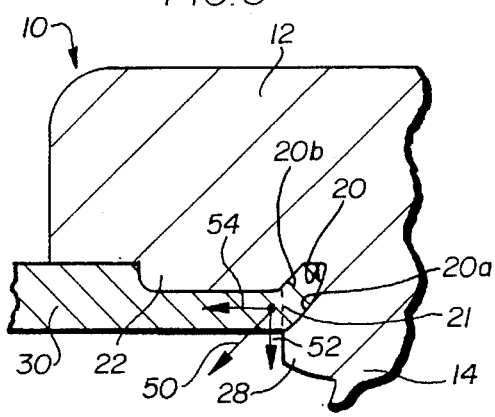
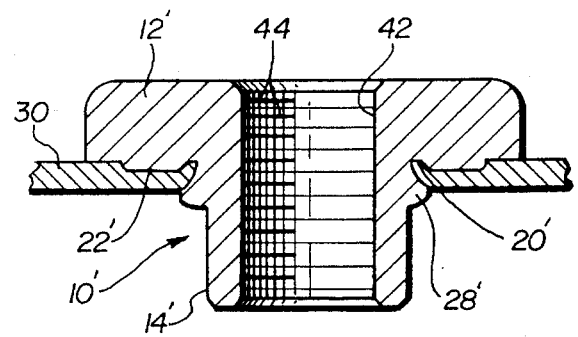

STAKED FASTENER WITH UNDERCUT

BACKGROUND OF THE INVENTION

The present invention relates generally to staked or self-clinching fasteners and methods of manufacture thereof. More particularly, the present invention concerns an improved self-clinching fastener and method for making such a fastener, which fastener enables obtaining a predicted, predetermined locking action with respect to a section of sheet material to which the fastener is to be attached or staked in use.

Self-clinching fasteners, also variously called staked, self-locking and counter-sinking fasteners, are generally known in the art, and are of numerous designs. These fasteners employ various clinching or staking methods for connection to sections of sheet material or other similar workpieces. Many such prior art fasteners are of the type which are assembled in a preformed hole in a sheet material, whereupon the head portion of the fastener is seated and embedded in a facing surface of the sheet material to cause displacement or cold flowing of a portion of the sheet material radially inwardly of the preformed aperture therein. This displacement is such as to cause the material to flow into intimate contact with facing surfaces of the fastener including a locking groove formed therein, thus providing means for maintaining the fastener in relatively rigid engagement with the sheet material.

The art has provided a number of structures for variously forming undulations, locking grooves or other surface features on the fasteners for engagement with the flowing material of the sheet material during seating and embedding of the fastener to achieve the desired mechanical interlock or engagement between the fastener and the sheet material.

One particularly useful and successful form of such a prior art fastener is shown in U.S. Pat. No. 3,967,669. As explained in this patent, the fastener thereof employs an extruding section of larger diameter than the preformed aperture in the sheet material, which is formed about the shank of the fastener axially spaced from the underside of the head. It is the function of this extruding section or "sizing ring" as it is sometimes called, to essentially resize the aperture to a predetermined larger diameter such as to assure that a sufficient amount of material of the sheet will be deformed into close engagement with the locking surfaces and/or locking features of the fastener upon the seating and embedding of the fastener in the sheet material.

As further discussed in the above-referenced prior U.S. patent, the degree or strength of the mechanical interlock or connection between the fastener and sheet is dependent upon the shear area achieved by the mechanical interlock. This shear area is generally defined as the cross-sectional area of the material displaced into the locking groove or other locking feature of the fastener, taken in the direction of shearing, that is axially. In this regard, the fastener of the above-referenced '669 patent includes a locking groove comprising a generally annular groove which is defined intermediate the underside of the head portion of the fastener and the enlarged diameter extruding section or sizing ring. Accordingly, it has heretofore been deemed desirable to make the width of the locking groove as great as possible in order to maximize this axial shear area. However, with thin sheet materials, it is not possible to employ a relatively wide groove, since insufficient sheet material will be present to deform into close contact with the outer surface of the groove throughout a relatively wide groove.

In the above-referenced '669 patent, the extruding section or sizing ring was designed to overcome the above-described problem with relatively thin sheet materials, by permitting reworking of the sheet material aperture to displace an increased amount of material into the locking groove. This enabled employment of a fastener with a relatively wide locking groove with relatively thin sheet materials. That is, a relatively small aperture could be initially formed in the sheet material, whereupon the extruding section or sizing ring would greatly enlarge and reform the aperture resulting in a significant quantity of additional material from about the former smaller aperture being displaced and available to be formed into engagement with the locking groove.

The fastener of the '669 patent also employs a locking feature comprising a first series of arcuately curved surfaces and a second series of arcuately curved surfaces which are curved oppositely of the first series and alternate therewith while merging smoothly therewith. That is to say, the surfaces of one of the series of surfaces are generally concave whereas the surfaces of the second series are convex viewed in the radial direction relative to the head and shank of the fastener. These surfaces project axially from the underside of the head and radially from the shank. Preferably, the first and second series of arcuately curved surfaces are each six in number. Preferably, the particular design or configuration of these arcuately curved surfaces is that disclosed in U.S. Pat. No. 3,584,667.

The present invention improves yet further upon this prior art arrangement by providing an annular undercut groove in a staked locking fastener, said groove radially surrounding the shank portion of the fastener where it extends from the head. The depth of the undercut groove is preferably at least one-half of the axial height of the locking projections, which may take various forms. As will be more fully described hereinbelow, this undercut groove will become filled with the deformed material of the sheet upon clinching or embedding of the fastener into the sheet material. In the present invention, a sizing ring is of a greater outer diameter than the inner diameter of this annular undercut groove and is axially spaced from the groove. As such, additional axial shear area is defined, that is, generally in the axial direction of the depth of the groove thus even further increasing the shear area, and consequently, even further strengthening the mechanical connection between the fastener and the sheet material.

As an additional matter, we have found that the formation of the annular undercut groove further facilitates and enhances the formation of the above-discussed type of locking feature, in a fastener employing a locking feature of the type. That is, we have found that with the above-discussed undercut annular groove, the arcuately curved surfaces of the locking feature or projections can be more clearly and sharply defined particularly in their radially outermost axially extending faces. This formation of the axial or vertical side walls of the arcuately curved surfaces or "displacement lobes" as they are sometimes termed, provides increased resistance to either clockwise or counterclockwise motion of the fastener relative to the sheet material and hence an increase in unsupported torque resistance.

OBJECTS AND SUMMARY OF THE INVENTION

It is a general object of this invention to provide a novel and improved self-clinching fastener.

A related object is to provide a novel method of forming a self-clinching fastener in accordance with the foregoing object.

In accordance with one aspect of the invention, there is provided a self-clinching fastener of the type for connection to a section of sheet material having an aperture formed therein for receiving said fastener, said self-clinching fastener comprising: a head portion; a shank portion having a smaller outer diameter than said head portion and extending axially from one side of said head portion; a plurality of projections extending axially from said one side of said head portion and extending radially outwardly of said shank portion; an undercut annular groove provided inwardly of said projections, extending axially in the direction of said head portion and radially surrounding said shank portion; and an enlarged diameter, generally annular sizing ring formed about said shank portion, axially spaced from said one side of said head portion by an amount somewhat greater than the axial extent of said projections, said sizing ring having an outer diameter greater than the outer diameter of said shank portion and also greater than an inner diameter of said undercut annular groove.

In accordance with another aspect of the invention there is provided a blank for forming a self-clinching fastener of the type for connection to a section of sheet material having an aperture formed therein for receiving said fastener, said blank comprising: a head portion of a preselected outer diameter; a shank portion of outer diameter smaller than the outer diameter of said head portion and extending axially from one side of said head portion, said shank portion having an enlarged diameter portion extending a predetermined distance axially outwardly from said one side of said head portion; a plurality of projections extending axially from said one side of said head and extending radially outwardly of said enlarged diameter shank portion; and an undercut annular groove formed inwardly of said projections, extending axially in the direction of said head portion and radially surrounding said enlarged diameter shank portion.

In accordance with yet another aspect of the invention there is provided the combination of a section of sheet material having an aperture with a self-clinching fastener engaged with said section of sheet material and extending through said aperture, wherein said self-clinching fastener comprises: a head portion a shank portion having a smaller outer diameter than said head portion and extending axially from one side of said head portion; a plurality of projections extending axially from said one side of said head portion and extending radially outwardly of said shank portion; an undercut annular groove formed inwardly of said projections, extending axially in the direction of said head portion and radially surrounding said shank portion; and an enlarged diameter, generally annular sizing ring formed about said shank portion, axially spaced from said one side of said head portion by an amount somewhat greater than the axial extent of said projections, said sizing ring having an outer diameter greater than the outer diameter of said shank portion and also greater than an inner diameter of said undercut annular groove.

In accordance with yet a further aspect of the invention there is provided a method of forming a self-clinching fastener of the type for connection to a section of sheet material having an aperture formed therein for receiving said fastener, said method comprising the steps of: providing an elongate, generally cylindrical member of a preselected outer diameter; heading said elongate cylindrical member to form an enlarged diameter head portion at one end thereof and thereby define an elongate shank portion extending axially from said head portion; forming an enlarged diameter shank portion extending a preselected distance axially outwardly of said head portion; forming a plurality of projections extending axially from a surface of the head portion from which the elongate shank projects, and extending radially outwardly from said enlarged diameter shank portion; and forming an undercut annular groove inwardly of said projections, extending axially in the direction of said head portion and radially surrounding said enlarged diameter shank portion.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

FIG. 1 is a side elevation, partially in section, of a self-clinching fastener in accordance with the present invention;

FIG. 2 is a partial perspective view of the fastener of FIG. 1, illustrating the construction of the underside of the head portion;

FIG. 3 is a sectional view taken generally along the line 3—3 of FIG. 1;

FIG. 4 is an axial section through a blank for forming the fastener of FIG. 1;

FIG. 5 is a partial sectional view illustrating formation of a locking ring on the blank of FIG. 4;

FIG. 6 is a partial sectional view illustrating an initial step in the assembly of the fastener of FIG. 1 with a preformed aperture in a sheet material;

FIG. 7 is a partial sectional view similar to FIG. 6, illustrating completion of the assembly of the fastener to the sheet material;

FIG. 8 is an enlarged partial view of portion of FIG. 7;

FIG. 9 is a sectional view similar to FIG. 7 and illustrating employment of the present invention in an internally threaded fastener or nut;

DETAILED DESCRIPTION OF THE ILLUSTRATED EMBODIMENT

Figure 10:
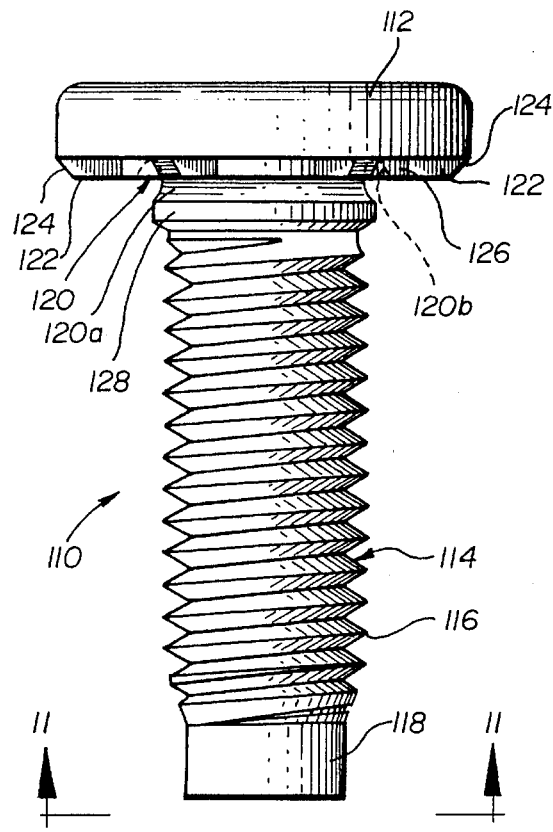
FIG. 10 is a side elevation of a second embodiment of a fastener in accordance with the present invention.

Referring now to the drawings, and initially to FIGS. 1–3, a staked or self-clinching fastener of the type for connection to a section of sheet material in accordance with the invention is designated generally by the reference numeral 10. The fastener 10 includes an enlarged diameter head portion 12 and an elongated shank portion 14 of smaller outer diameter than the outer diameter of the head 12, which projects generally centrally axially from the head 12. In the embodiment illustrated in FIG. 1, the shank portion 14 is formed with an external screw type thread 16. Also in the embodiment illustrated in FIG. 1, the thread 16 terminates at an outer end of the shank 14 in a series of truncated or reduced diameter threads leading to a short, unthreaded lead-in portion 18.

As will be seen later herein, the invention also applies to an internally threaded or nut type of fastener. One example of such a fastener is shown in FIG. 9.

A displacement portion 22 extends axially from the underside of the head and is radially spaced from and surrounds the shank 14. This displacement portion 22 has projections 24 which extend radially outwardly from the shank 14. In the embodiments of FIGS. 1–9, these projections or displacement lugs 24 preferably comprise a first series of radially outwardly curved or convex surfaces 24. A second series of oppositely, that is, radially inwardly curved or concave surfaces 26 merge smoothly with the first series of surfaces 24. Preferably, the first series and second series each comprise a total of six (6) curved surfaces, such that the overall configuration is hexlobular while the centers of the first series of surfaces generally define a regular hexagon. The particular design or configuration of these surfaces 24 and 26 is preferably as illustrated and described in U.S. Pat. No. 3,584,667, which is incorporated herein by reference to this extent.

In accordance with a feature of the invention, an undercut annular groove 20 is formed radially inwardly of the displacement portion 22, extending axially toward the underside of the head portion 12, that is, the side from which the shank 14 projects. The groove may be formed in the head portion per se, or in the material which serves to define the displacement portion 22. This undercut annular groove 20 radially surrounds the shank 14 in the area about which the shank 14 projects from the head 12. The undercut annular groove 20 is defined at least partially by a generally conical or tapered wall surface 20a which surface converges in the direction of fastener head portion 12. Also a generally opposed, facing conical or tapered surface 20b is defined by the groove 20, which surface is spaced from surface 20a and also converges in the direction of the head 12. The axial depth of the groove 20 is at least one-half of the axial height of the displacement portion 22, and preferably, equal to or greater than the axial height of the displacement portion 22.

Axially spaced somewhat from the displacement portion 22 along the shank 14, there is formed an enlarged diameter, generally annular extruding member or sizing ring 28, surrounding and projecting radially from the shank 14. That is, the sizing ring 28 is axially spaced from the underside of the head 12 by an amount somewhat greater than the axial extent or height of the displacement portion 22. The outer diameter of the sizing ring 28 is greater than the inner diameter of the undercut annular groove 20 and also greater than the outer diameter of the threads 16 on shank 14.

Referring now to FIGS. 6–8, having described the basic structure of the fastener in accordance with the invention, further features and advantages thereof will be best understood upon consideration of the operation of the fastener in connection with a section of sheet material 30 to which the fastener is to be attached or staked. The sheet material 30 is provided with a through aperture 32 for receiving a fastener 10. However, it is to be noted that the diameter of the aperture 32 is preferably equal to or smaller than the outer diameter of the sizing ring 28.

This is done to assure that the passage of the sizing ring 28 through the aperture 32 will resize the aperture 32 so that it will closely overly the groove 20, immediately prior to the embedding of the displacement portion 22 into the sheet material. Thus, a portion of the sheet material to the radially inner side of the displacement portion 22 will be displaced or flow radially inwardly and axially upwardly into the groove 20. This forcing of material into groove 20 results in a joint between fastener and workpiece which is able to resist increased pushout forces. However, the material to the radially outer side of the displacement portion 22 will be either compressed or flow in a circumferential direction and be compressed between the projections 24. This results in a joint between fastener and workpieces which is able to resist increased torque or turning of the fastener. Thus, the relationship of the sizing ring 28 to aperture 32 insures that the fastener will displace sufficient material of the sheet 30 about the aperture 32 to fill in the space or volume under the head of the fastener from and including the undercut groove 20 to and including the facing surfaces of the sizing ring 28, as is illustrated for example in FIG. 7.

Cooperatively, in this regard, the overall volume of the displacement portion 22 is designed and selected such as to displace enough material of the sheet 30 upon embedding of the lugs in the material to further assure complete filling of the above-described space with the material of the sheet 30, as illustrated in FIG. 7. During the initial displacement of the workpiece 30, the tapered surfaces 20a and 20b of groove 20 serve to direct the flow of material inwardly and upwardly into the groove 20 at an angle of approximately 45°± 15°. As will be discussed more fully herewith with respect to FIG. 8, this feature of the invention also serves to enhance the overall strength of the joint attained.

As illustrated in FIG. 6, in operation, it is generally preferred to utilize an apertured die member 34 and a punch member 36 to accomplish the staking or engagement of the fastener 10 with the sheet 30. In this regard, the die 34 has an aperture 38 of sufficient diameter for freely receiving the threaded shank 14 therethrough. This aperture 38 preferably has an enlarged entrance portion 40 of sufficient diameter to freely receive the sizing ring 28 therein when punch 36 has fully advanced the fastener 10 relative to the sheet 30 and die 34.

As mentioned hereinabove, the invention applies as well to an internally threaded nut type of fastener, for example as shown in FIG. 9. The fastener 10' of FIG. 9 is similar in structure to the fastener 10 described above in that it includes an enlarged head 12', a projecting, although relatively short, shank 14', displacement portion 22', an undercut annular groove 20', and a sizing ring 28'. Preferably the groove 20', displacement portion 22' and sizing ring 28 are identical to those described hereinabove. However, the fastener 10' is a nut type fastener having an internal central through bore or opening 42 which is internally threaded as indicated by reference numeral 44. In all other respects, the clinching or coupling of the fastener 10' with the sheet material 30 is the same as illustrated and described hereinabove with respect to the externally threaded screw type fastener 10.

Referring now to FIG. 8, further advantages of the present invention will be appreciated on considering the configuration of the shear forces or axial shear area achieved by the structure of the invention. As mentioned hereinabove, the degree or strength of the mechanical connection between the fastener 10 and sheet material 30 is dependent upon the shear area achieved by the mechanical interlock. Moreover, the shear area is generally defined as the cross-sectional area of the material displaced into the annular undercut groove 20 taken in the direction of shearing, that is, axially, including the volume or space between the surfaces 20a and 20b. An increase in shear area in turn translates into a performance increase in pushout strength. At this point it should be noted that the tapered surfaces 20a and 20b of the groove 20 have directed the flow of material upwardly into the groove 20, assuring that the entire groove is filled.

In viewing a shearing or extruding force 50 which would tend to push the material back outwardly of the undercut groove 20 and adjacent space or volume, it will be seen that the material must in fact shear or extrude to a considerable extent in the axial direction as well as in the radial direction in order to extrude around both the displacement portion 22 and the annular sizing ring 28. In this regard, an extruding force 50 and its respective vertical or axial and horizontal or radial components 52, 54 are indicated generally by arrows in FIG. 8. That is, the material must follow a somewhat tortuous route in extruding back outwardly of the undercut groove 20 and the volume or space between the surfaces 20a and 20b. In practice, the annular opening into the groove 20 indicated by the dotted line 21 in FIG. 8 provides a choke location through which material must flow, and the flow is resisted due to the direction change through which the material 30 must go in order to flow out of the groove 20. Thus, the pushout performance is believed improved with the present invention over that realized with prior art clinch-type fasteners, as for example the type shown in the above-mentioned U.S. Pat. No. 3,967,669.

Referring now to FIGS. 4 and 5, some discussion regarding the method of manufacture or formation of the fastener in accordance with the invention may be useful in further understanding the features and advantages of this fastener as described hereinabove. Advantageously, the fastener of the invention can be relatively simply and inexpensively formed from conventional materials by relatively few and simple operations, making the fastener of the invention relatively economical to produce in quantity.

Referring first to FIG. 4, there is illustrated a blank 10b, ready for further cold forming to form the sizing ring 28 and thread rolling to form the external thread 16 on the shank 14. It will be appreciated, that with the exception of the formation of an external thread 16, the formation of an internally threaded or nut type fastener such as the fastener 10a shown in FIG. 9 will be substantially identical to the formation of the externally threaded screw type fastener 10.

The fastener may be initially formed by cold forming or heading operations on a generally elongate cylindrical piece of material which forms the shank 14. The tapered lead-in portion 18 can also be cold formed on the blank 10b. Initially, the head 12 is formed, such that the shank 14 projects centrally axially therefrom. Preferably, the part is further provided with an increased diameter shoulder portion 14b of the shank 14 extending a preselected distance axially outwardly from the head 12.

The annular undercut groove 20 is formed by heading the displacement portion 22 in such a manner as to leave this annular undercut groove area 20 at a radially inner part of the displacement portion 22 and immediately adjacent to (i.e., radially outwardly of), and surrounding the enlarged diameter shank portion 14b. As an added and unexpected advantage, we have found that the formation of the displacement portion 22 with the annular undercut groove 20 results in a better formation of the vertical or axially extending outer walls 22b of the displacement portion. This results in less angled relief to these surfaces 22b, and gives an overall better engagement and increased resistance to rotational motion when the displacement portion 22 is embedded in the sheet material 30 as illustrated for example in FIG. 7.

The enlarged diameter shank portion 14b can then be deformed or upsetted to form the sizing ring 28, for example as indicated in FIG. 5. In this regard, a suitable die 60 can be utilized having a through central opening 62 of generally the same diameter as the diameter of the shank 14, that is, of smaller diameter than increased diameter or shoulder portion 14b. Thus, when the blank 10b is pressed downwardly into this die to the extent shown in FIG. 5, the material of the section 14b is displaced upwardly to form the sizing ring 28. As mentioned, the outer diameter of the sizing ring should be larger than the outer diameter of the undercut groove 20. This upsetting process can advantageously be done in primary forming of equipment or, if preferred, as a secondary operation. Thus, the diameter and axial length of shank portion 14b is determined by the amount of material needed to form the sizing ring 28 of the desired size in this fashion.

It should be further noted, that in the preferred embodiment illustrated herein, the inner diameter of the annular undercut groove 20 is preferably somewhat greater than the pitch diameter of the thread 16 when the same is formed on the shank 14. This will occur when the displacement portion 22 and undercut groove 20 are formed about the increased diameter shank portion 14b, prior to formation of the sizing ring 28. In this regard the outer diameter of the shoulder portion 14b is greater than the pitch diameter of the thread 16. It will be appreciated that thread 16 can be formed by a thread rolling operation, for example, following the completion of the heading process and formation of the sizing ring 28 as illustrated and described above with reference to FIGS. 4 and 5.

Figure 12:
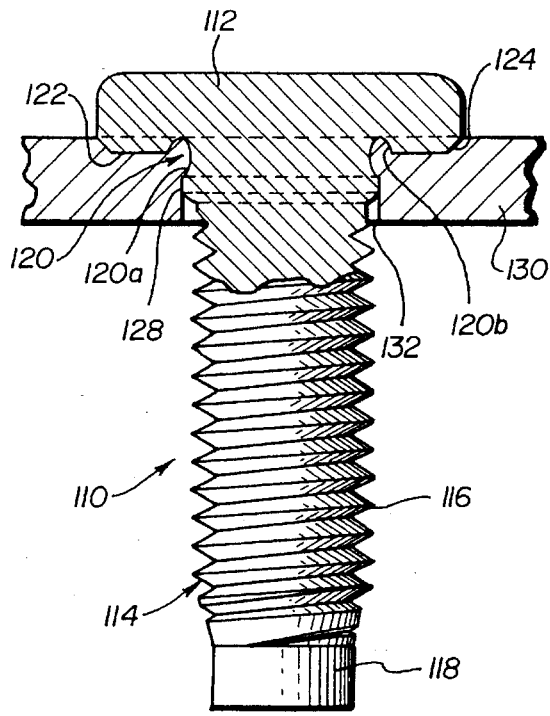
FIG. 12 is an axial sectional view, similar to FIG. 7, with the fastener being viewed generally along the line 12—12 of FIG. 11.
Figure 11:
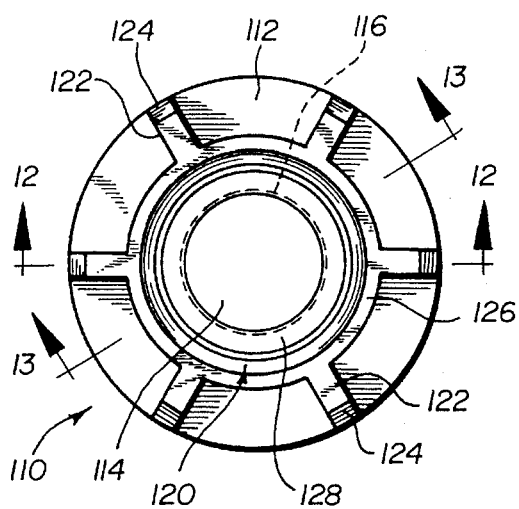
FIG. 11 is a sectional view taken generally along the line 11—11 of FIG. 10.
Figure 13:
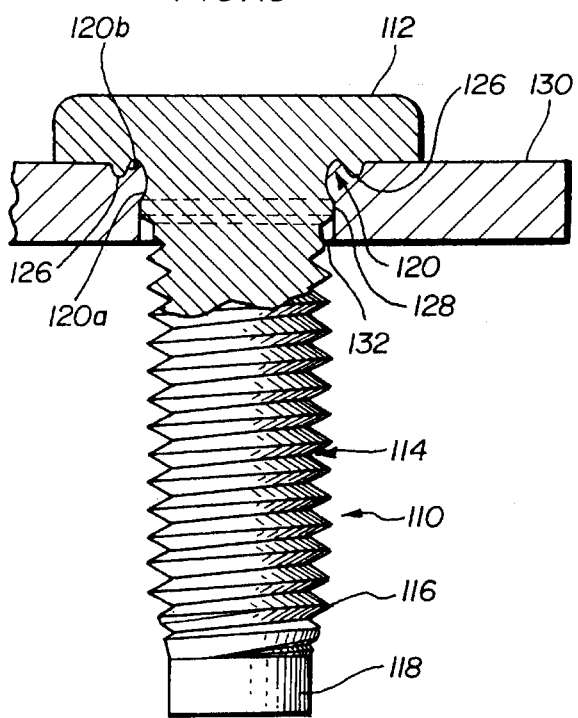
FIG. 13 is an axial sectional view, similar to FIG. 7, with the fastener being viewed generally along the line 13—13 of FIG. 11.

Referring now to FIGS. 10–13, another embodiment of a fastener in accordance with the present invention is designated generally by the reference numeral 110. Fastener 110 has an enlarged diameter head 112 and an elongated shank 114 which projects axially from one side thereof. Preferably, the shank 114 is externally threaded as indicated at reference numeral 116. However, the head 112 and shank 114 may be internally threaded in the manner shown for example in FIG. 9, without departing from the invention. A lead in portion 118 is also provided on the shank 114.

In accordance with the invention, a plurality of projections or displacement lugs 122 extend axially from the underside of the head 112 and extend radially outwardly from the shank 114. In the embodiment of FIGS. 10–13, as perhaps best viewed in FIG. 11, the lugs 122 comprise generally rectilinear radially extending elements. Preferably, outer edges of the lugs 122 are tapered inwardly as indicated at reference numeral 124. In the illustrated embodiment, these lugs are six in number and are equally angularly spaced about the underside of the head 112. The lugs 122 terminate or merge at their radially inner ends at a generally annular axially projecting displacement ring 126. The displacement ring 126 comprises an annular member which projects axially outwardly of the head 112, that is, in the same direction as shank 114. More or fewer such lugs 122 and different angular spacings thereof might be employed without departing from the invention.

In similar fashion to the embodiment of FIGS. 1–9, an undercut annular groove 120 is formed radially inwardly of the projections 122 and also radially inwardly of the displacement ring 126, and extends axially toward the underside of the head portion 112, that is the side from which the shank 114 projects. It will be noted in this regard that in the embodiment of FIGS. 1–9, the displacement portion 22 itself serves the same function as the displacement ring 126 which will be discussed further hereinbelow. That is, the undulations 24, 26 in effect form an axially projecting surface which completely surrounds the undercut annular groove 20 in much the same way as the displacement ring 126 completely surrounds the undercut annular groove 120 of the embodiment of FIGS. 10–13.

The axial depth of the undercut groove 120 is at least one-half of the axial height of the lugs 122, and preferably, is equal or greater than this axial height. In similar fashion to the embodiments of FIGS. 1–9, the groove 120 is defined at least partially by a generally conical or tapered wall surface 120a which converges in the direction of the fastener head portion 12 and a generally opposed, facing conical or tapered surface 120b which is spaced from the surface 120a and also converges in the direction of the head 12. It will be noted that surface 120a curves inwardly from the radially outermost part or surface of the sizing ring 128 whereas the surface 120b curves inwardly from a radially inner edge or surface of the displacement ring 126.

The sizing ring 128 is similar to the sizing ring 28 of the embodiments of FIGS. 1–9. In this regard, the sizing ring 128 forms an enlarged diameter, generally annular extruding member which is axially spaced from the projections 122 along the shank 114. That is, the sizing ring 128 is axially spaced from the underside of the head 112 by an amount somewhat greater than the axial extent or height of the projections 122. The outer diameter of the sizing ring 128 is greater than the inner diameter of the undercut annular groove 120 and also greater than the outer diameter of the threads 116 on the shank 114.

Accordingly, upon advancement and embedding of the fastener 110 with respect to a workpiece (see FIGS. 12 and 13), a similar flow of material of the workpiece 130 will occur to that described above with reference to FIGS. 1–8. That is, a portion of the sheet material to the radially inner side of the displacement ring 126 will be displaced radially inwardly and upwardly into the groove 120. This forcing of material into the groove 120 results in a joint between the fastener 110 and a workpiece 130 which is able to resist increased pushout forces.

On the other hand, material to the radially outer side of the displacement ring 126 will be displaced by the ring and by the lugs 122 and be compressed or flow in a circumferential direction which tends to compress material between the lugs 122. When thus compressed, the joint formed between the fastener 110 and a workpiece is able to withstand increased torque or turning forces on the fastener 110 once embedded.

It is believed that the form of the fastener as shown in FIGS. 10–13 displaces less material overall than the fastener as shown in FIGS. 1–8, and is therefore preferable for employment with certain materials such as cast iron, cast aluminum, cast zinc and other materials having a relatively low modulus of elasticity. On the other hand, the embodiments of the fastener as shown in FIGS. 1–9 would preferably be employed with materials having a somewhat higher modulus of elasticity or somewhat more malleable materials.

Similar to the operation described above for the previous embodiments, the material displaced into the undercut annular groove 120 will be caused to flow in a generally upward and inward direction, that is at an angle of approximately 45°± 15° relative to the axial direction of the shank 114. By the same token, when encountering pushout forces, the material in the groove 120 will resist being forced back outwardly of the groove 120, which will require axial and radial movement of the material in generally the opposite angular direction as the above-described flow of material being introduced to the groove 120 upon embedding of the fastener in a workpiece. Thus, such pushout forces will be effectively resisted by the displacement of material in this regard.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The Invention is claimed as follows:

1. A self-clinching fastener of the type for connection to a section of sheet material having an aperture formed therein for receiving said fastener, said self-clinching fastener comprising: a head portion; a shank portion having a smaller outer diameter than said head portion and extending axially from one side of said head portion; a displacement portion extending axially from said one side of said head portion radially surrounding and extending radially outwardly of said shank portion; an undercut annular groove provided radially inwardly of said displacement portion, extending axially in the direction of said head portion and radially surrounding said shank portion, wherein said groove is defined by a first tapered surface converging in the direction of said head portion and a second, tapered surface, spaced from said first tapered surface and also converging toward said head portion; and an enlarged diameter, generally annular sizing ring formed about said shank portion, axially spaced from said one side of said head portion by an amount somewhat greater than the axial extent of said displacement portion, said sizing ring having an outer diameter greater than the outer diameter of said shank portion and also greater than an inner diameter of said undercut annular groove.

2. A self-clinching fastener as defined in claim 1, wherein said displacement portion includes a plurality of radially outwardly extending projections.

3. A self-clinching fastener as defined in claim 2, wherein said projections are defined by a first series of arcuately curved surfaces and a second series of arcuately curved surfaces curved oppositely of said first series and alternating with, while merging smoothly with said first series.

4. A self-clinching fastener as defined in claim 1 wherein the depth of said undercut annular groove is at least one-half the axial height of said displacement portion.

5. A self-clinching fastener according to claim 1, wherein said head and said shank portion comprise an internally threaded through bore.

6. A self-clinching fastener according to claim 1, wherein said displacement portion further includes an annular displacement ring intermediate said projections and said undercut annular groove.

7. A self-clinching fastener as defined in claim 1, wherein said undercut annular groove extends 360°, completely surrounding said shank portion.

8. A self-clinching fastener as defined in claim 1, wherein said displacement portion extends 360°, completely surrounding said undercut annular groove.

9. A self-clinching fastener as defined in claim 1, wherein said shank portion is externally threaded.

10. A blank for forming a self-clinching fastener of the type for connection to a section of sheet material having an aperture formed therein for receiving said fastener, said blank comprising: a head portion of a preselected outer diameter; a shank portion of outer diameter smaller than the outer diameter of said head portion and extending axially from one side of said head portion, said shank portion having an enlarged diameter portion extending a predetermined distance axially outwardly from said one side of said head portion; a displacement portion extending axially from said one side of said head extending radially outwardly of said enlarged diameter shank portion; and an undercut annular groove formed inwardly of said displacement portion, extending axially in the direction of said head portion and radially surrounding said enlarged diameter shank portion; wherein said groove is defined by a first tapered surface converging in the direction of said head portion and a second, tapered surface, spaced from said first tapered surface and also converging toward said head portion.

11. A blank as defined in claim 10, wherein said undercut annular groove extends 360°, completely surrounding said shank portion.

12. A blank as defined in claim 10, wherein said displacement portion extends 360°, completely surrounding said undercut annular groove.

13. A blank as defined in claim 10, wherein said shank portion is externally threaded.

14. A blank for a self-clinching fastener as defined in claim 10, wherein said displacement portion includes a plurality of radially outwardly extending projections.

15. A blank for a self-clinching fastener, as defined in claim 14, wherein said projections are defined by a first series of arcuately curved surfaces and a second series of arcuately curved surfaces curved oppositely of said first series and alternating with, while merging smoothly with said first series.

16. A blank for a self-clinching fastener as defined in claim 14, wherein said displacement portion includes an annular displacement ring intermediate said projections and said undercut annular groove.

17. The combination of a section of sheet material having an aperture with a self-clinching fastener engaged with said section of sheet material and extending through said aperture, wherein said self-clinching fastener comprises: a head portion; a shank portion having a smaller outer diameter than said head portion and extending axially from one side of said head portion; a displacement portion extending axially from said one side of said head portion and extending radially outwardly of said shank portion; an undercut annular groove formed radially inwardly of said displacement portion, said groove extending axially in the direction of said head portion and radially surrounding said shank portion, wherein said groove is defined by a first tapered surface converging in the direction of said head portion and a Second, tapered surface, spaced from said first tapered surface and also converging toward said head portion; and an enlarged diameter, generally annular sizing ring formed about said shank portion, axially spaced from said one side of said head portion by an amount somewhat greater than the axial extent of said, displacement portion said sizing ring having an outer diameter greater than the outer diameter of said shank portion and also greater than an inner diameter of said undercut annular groove.

18. The combination as defined in claim 17, wherein said undercut annular groove extends 360°, completely surrounding said shank portion.

19. The combination as defined in claim 17, wherein said displacement portion extends 360°, completely surrounding said undercut annular groove.

20. The combination as defined in claim 17, wherein said shank portion is externally threaded.

21. The combination, as defined in claim 17, wherein said head and said shank define a central internally threaded through aperture.

22. The combination, as defined in claim 17, wherein said displacement portion includes a plurality of radially outwardly extending projections.

23. The combination, as defined in claim 22, wherein said projections are defined by a first series of arcuately curved surfaces and a second series of arcuately curved surfaces curved oppositely of said first series and alternating with, while merging smoothly with said first series.

24. The combination, as defined in claim 22, wherein said displacement portion further includes an annular displacement ring intermediate said projections and said undercut annular groove.

25. A self-clinching fastener of the type for connection to a section of sheet material having an aperture formed therein for receiving said fastener, said fastener comprising: a head portion of a preselected outer diameter; a shank portion of outer diameter smaller than the outer diameter of said head portion and extending axially from one side of said head portion, said shank portion having an enlarged diameter portion extending a predetermined distance axially outwardly from said one side of said head portion; a displacement portion extending axially from said one side of said head extending radially outwardly of said enlarged diameter shank portion; and an undercut annular groove formed inwardly of said displacement portion, extending axially in the direction of said head portion and radially surrounding said enlarged diameter shank portion, wherein said groove is defined by a first tapered surface converging in the direction of said head portion and a second, tapered surface, spaced from said first tapered surface and also converging toward said head portion.

26. A self-clinching fastener according to claim 25, wherein said head and said shank portion comprise an internally threaded through bore.

27. A self-clinching fastener as defined in claim 25, wherein said undercut annular groove extends 360°, completely surrounding said shank portion.

28. A self-clinching fastener as defined in claim 25, wherein said displacement portion extends 360°, completely surrounding said undercut annular groove.

29. A self-clinching fastener as defined in claim 25, wherein said shank portion is externally threaded.

* * * * *